United States Patent
Kubo et al.

[15] 3,698,829
[45] Oct. 17, 1972

[54] CONTROL DEVICE FOR TURBINE GENERATORS

[72] Inventors: Moritada Kubo; Yasuo Shinomiya, both of Tokyo, Japan

[73] Assignee: Tokyo Shibaura Electric Co., Ltd., Kawasaki-shi, Japan

[22] Filed: Jan. 12, 1971

[21] Appl. No.: 105,806

[52] U.S. Cl. .....................415/36, 318/610, 318/611
[51] Int. Cl. ................................................H02p 9/04
[58] Field of Search ....318/610, 611; 415/16, 17, 36, 415/37; 60/10 S; 290/40, 41

[56] References Cited

UNITED STATES PATENTS

| | | | |
|---|---|---|---|
| 3,283,230 | 11/1966 | Davies et al. | 318/611 |
| 3,097,488 | 7/1963 | Eggenberger | 415/17 X |
| 3,340,883 | 9/1967 | Peternel | 415/17 X |
| 3,291,146 | 12/1966 | Walker | 415/17 X |

*Primary Examiner*—G. R. Simmons
*Attorney*—Flynn & Frishauf

[57] ABSTRACT

A control device for turbine generators comprising adjustment valve means disposed in a series circuit including a source of elastic fluid (compressible fluid) and a turbine generator driven by fluid supplied from the source so as to control the flow rate of fluid to the turbine; a revolution counter for measuring the number of rotations of the turbine; a circuit for differentiating the output from the revolution counter; a differential amplifier for comparing the output from the differentiation circuit with a preset reference valve and generating a resulting error valve; a second differential amplifier receiving the output of the differentiation circuit and a second reference value and generating an error value and a P.I.D. control circuit receiving the outputs from said differential amplifiers for generating a control output including to control the adjustment valve and in consequence the acceleration of the turbine.

2 Claims, 3 Drawing Figures

CONTROL DEVICE FOR TURBINE GENERATORS

The present invention relates to a control device for elastic fluid turbine generators and more particularly to such a control device as is also capable of controlling angular acceleration.

With respect to a turbine generator, prevention of mechanical damage due to fatigue of the materials of the rotary shaft of a generator coupled with a turbine and other rotating parts such as turbine blades demands that mechanical torque and thermal stress applied to said rotating parts be constantly controlled. Since there arise sharp changes in the mechanical torque and thermal stress applied to the turbine rotor particularly at its start, it is very important to stabilize the angular speed change of the rotating parts including that at the start.

However, the conventional method of controlling a turbine generator mainly consists in stabilizing the rotational speed of a turbine, that is, controlling its angular speed on the basis of an overall control amount consisting of proportional, integral and differential values, namely, by the P.I.D. system. The angular acceleration of the rotating parts has only been controlled on the basis of proportional and integral control amounts. Accordingly, the prior art control method is unsatisfactory for full attainment of the object of preventing mechanical damage to the rotating parts due to the fatigue of their materials.

It is accordingly the object of the present invention to provide a control device for turbine generators which is capable of constantly stabilizing the angular speed of the rotor of the turbine generator.

SUMMARY OF THE INVENTION

The control device of the present invention comprises drawing out by means of a differential amplifier a balance between the output from a circuit differentiating the output from a speed detecting means of the turbine generator and a preset value and using the output from a control circuit together with the differentiated value of said balance of output in controlling the acceleration of the turbine generator.

A control device for turbine generators according to the present invention comprises control valve means disposed in a motive fluid line including a source of elastic fluid (compressible fluid) and a turbine generator driven by fluid supplied from the source so as to control the flow rate of fluid to the turbine; a speed detecting means for measuring the rotational speed of the turbine; a circuit for differentiating the output from the speed detecting means; a differential amplifier for comparing output from the differentiation circuit with a preset value and drawing out the resulting error value; and a control circuit for generating an output including the differentiated value of output from the differential amplifier thereby to control the control valve means and in consequence the acceleration of the turbine.

This invention can be more fully understood from the following detailed description when taken in connection with the accompanying drawings, in which.

Figure 1:
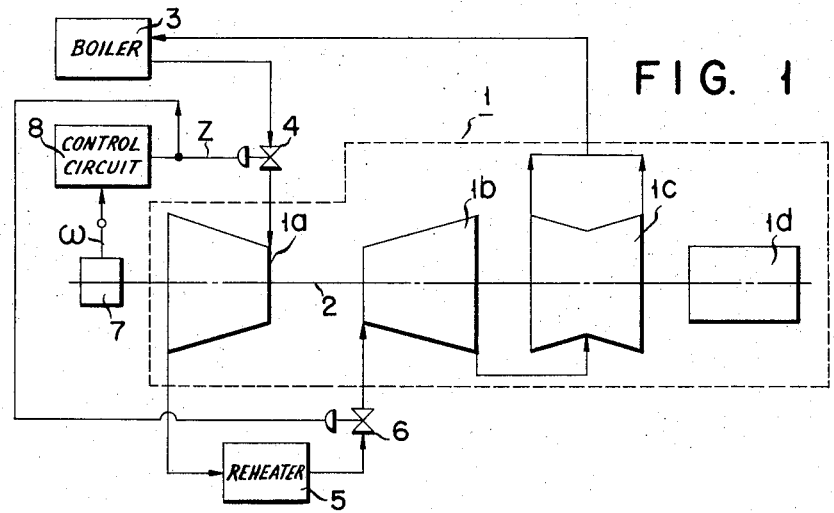
FIG. 1 is a block diagram of a control loop including a control device according to an embodiment of the present invention.
Figure 2:
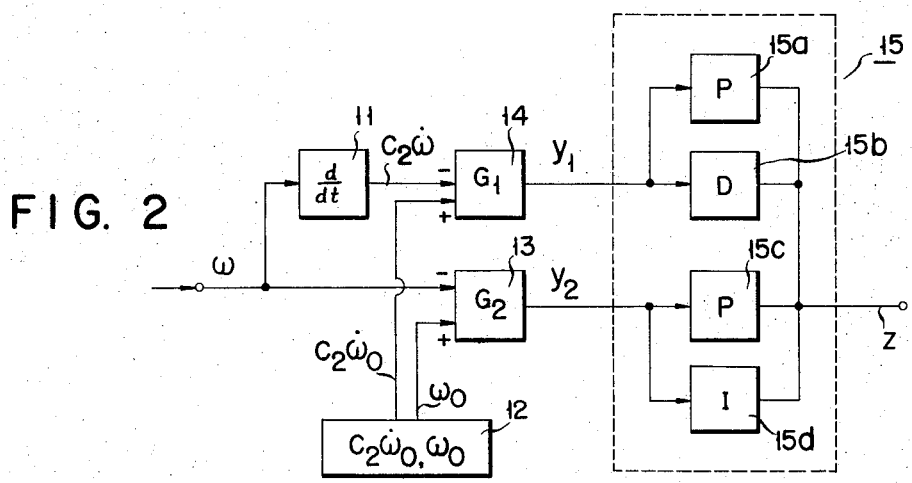
FIG. 2 is a block diagram of a control circuit associated with the control device of FIG. 1.

Referring to FIG. 1, numeral 1 denotes a turbine generator which consists of a high pressure turbine 1a, medium pressure turbine 1b, low pressure turbine 1c and generator 1d, all rotatably fitted to a common rotary shaft 2. Elastic fluid, for example, steam generated by a boiler 3 passes through a closed loop including control or adjustment valve means 4, high pressure turbine 1a, reheater 5, adjustment valve means 6, medium pressure turbine 1b and low pressure turbine 1c back to the boiler 3. There are omitted other means which are in practice incorporated in said closed loop. There is also provided a speed detector 7 for measuring the rotational speed of the turbine. Output $\omega$ from the speed detector 7 is conducted to a control circuit 8, output Z from which is in turn supplied as an amount of control to the adjustment valve means 4 and 6 which control the volume of steam to be supplied to the turbine.

The control circuit 8 comprises a differentiation circuit 11 for differentiating output $\omega$ from the revolution counter 7 to generate a differentiated control amount $C_2\dot\omega$ (where $C_2$ is a gain and $\dot\omega$ is $d\omega/dt$; a setter 12 for setting a reference value $\omega_0$ to the output $\omega$ and a reference value $C_2\dot\omega_0$ [where $C_2$ is a coefficient and $\dot\omega_0$ is $(d\omega/dt)_0$] to the differentiated control amount $C_2\dot\omega$; a first differential amplifier 13 (gain $G_2$) supplied with $\omega$ and $\omega_0$ to generate output $y_2$; a second differential amplifier 14 (gain $G_2$) supplied with the differentiated control amount $C_2\dot\omega$ and the reference value $C_2\dot\omega_0$ thereto to produce output $y_1$; a proportional controller 15a supplied with said output $y_1$ to generate a control amount proportionate to said $y_1$; a differential controller 15b for producing a control amount corresponding to the differentiated value of said $y_1$; a proportional controller 15c supplied with said output $y_2$ to generate a control amount proportionate to said $y_2$; and an integral controller 15d supplied with said output $y_2$ to produce a control amount corresponding to the integrated value of said $y_2$. Total output Z from these controllers is supplied to the adjustment valves 4 and 6.

Output $y_1$ from the differential amplifier 14 may be expressed as follows:

$$y_1 = C_2 G_1 \{(d\omega/dt)_0 - (d\omega/dt)\}] \qquad 1$$

Output $y_2$ from the differential amplifier 13 may be expressed as follows:

$$y_2 = G_2(\omega_0 - \omega) \qquad 2$$

Total output from the P.I.D. controller 15 including those from the controllers 15a, 15b, 15c and 15d may be expressed as follows:

$$Z = dy_1 + a\frac{dy_1}{dt} + by_2 + c\int y_2 dt \qquad (3)$$

where the coefficients b, c and d agree with those used with a conventional P.I.D. controller.

As seen from the above equation 3, the control device of the present invention includes in its total output Z a term $$a\frac{dy_1}{dt}$$

that is, a control amount for the angular acceleration of the rotor. In other words, a control amount corresponding to a differentiated value of errors in the angular acceleration of a turbine also takes part in controlling its angular speed change, more stabilizing the rotation torque and thermal stress applied to a turbine than has been possible with the prior art.

Figure 3:
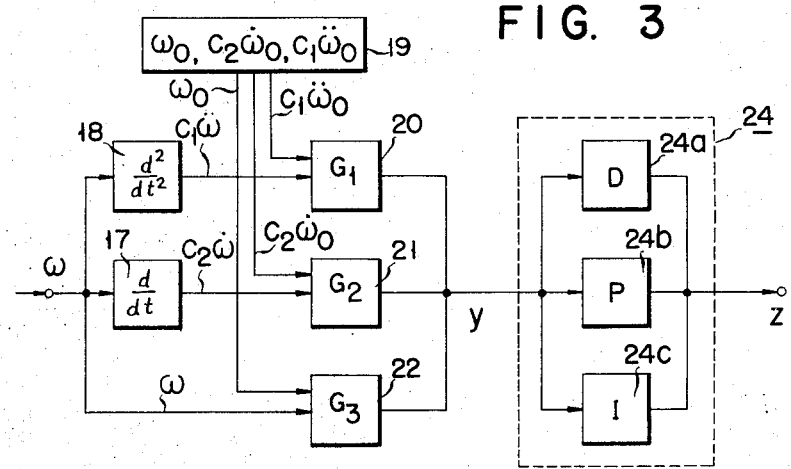
FIG. 3 is a block diagram of a control circuit associated with a control device according to another embodiment.

Another embodiment of the control circuit 8 is presented in FIG. 3. According to this embodiment, output ω from the speed detector 7 is conducted to a primary differentiation circuit 17 to obtain a primary differentiated control amount $C_2\dot{\omega}$ (where $C_2$ is a coefficient and $\dot{\omega}$ is $d\omega/dt$) and also to a secondary differentiation circuit 18 to obtain a secondary differentiated control amount $C_1\ddot{\omega}$ (where $C_1$ is a coefficient and $\ddot{\omega}$ is $d^2\omega/dt^2$). There is further provided a setter 19 for setting reference values $\omega_0$ and $C_2\dot{\omega}_0$ [where $C_2$ is a coefficient and $\dot{\omega}$ is $(d\omega/dt)_0$] but $C_1\ddot{\omega}$ [where $C_1$ is a coefficient and $\ddot{\omega}$ is $(d^2\omega/dt^2)_0$] to the aforesaid $\omega_1 C_2\dot{\omega}$ and $C_1\ddot{\omega}$ respectively. There are also used first, second and third differential amplifiers 20, 21 and 22 which are supplied with the output $C_1\ddot{\omega}$ + set value $C_1\ddot{\omega}_0$, output $C_2\dot{\omega}$ + set value $C_2\dot{\omega}_0$, and output ω + set value $\omega_0$ respectively, thereby to obtain an output representing a balance between the inputs of each group. A total output from these differential amplifiers 20, 21 and 22 is designated as $y$ and gains therein as $G_1$, $G_2$ and $G_3$ respectively.

The P.I.D. controller 24 comprises differential, proportional and integral controllers 24a, 24b and 24c which are supplied with the aforesaid output $y$ in common to produce total output Z. For briefness, there is omitted the description of the functions of these controllers which are the same as those of the preceding embodiment. Said total output Z is conducted to the adjustment valve means 4 and 6. The aforesaid output $y$ denotes signals of errors with respect to the preset value used in operation of a control device according to the present invention and is expressed as follows:

$$y = G_3(\omega_0 - \omega) + G_2\{C_2\dot{\omega}_0 - C_2\dot{\omega}\} + G_1\{C_1\ddot{\omega}_0 - C_1\ddot{\omega}\} \quad 4$$

The P.I.D. generates the following output derived from the above equation 4:

$$Z = a\frac{dy}{dt} + by + c\int y\,dt$$

where $a$, $b$ and $c$ are coefficients.

As seen from FIG. 3, the output $y$ already contains a control amount relative to the angular speed change ω of a turbine and a control amount corresponding to variations $\dot{\omega}$ in said speed change. It will be apparent, therefore, that adjustment of the valve means by said output Z permits the minute control of the angular speed change of a turbine generator, that is, the rotation torque applied to the rotary shaft.

What we claim is:

1. A control device for turbine generators having control valve means disposed in a fluid line including a source of elastic fluid and a turbine generator driven by fluid supplied from the source so as to control the feed rate of fluid to the turbine, a speed detecting means for measuring the rotational speed of the turbine and a control circuit for controlling the control valve means and in consequence the acceleration of the turbine as a function of a control output obtained by processing the output from said speed detecting means, said control circuit comprising:

a first differentiation circuit for differentiating the output (ω) from said speed detecting means to generate a first differentiated control value ($C_2\dot{\omega}$);

a setter for setting a first reference value ($\omega_0$) relative to the output (ω) from said speed detecting means and a second reference value ($C_2\dot{\omega}_0$) relative to the first differentiated control value ($C_2\dot{\omega}$);

a first differential amplifier coupled to the output (ω) from said speed detecting means and supplied with the first reference value ($\omega_0$) to generate an output ($y_2$);

a second differential amplifier coupled to the output ($C_2\dot{\omega}$) of said first differentiation circuit and supplied with the second reference value ($C_2\dot{\omega}_0$) to generate an output $y_1$; and a P.I.D. controller including a P.I. controller coupled to the output ($y_2$) from said first differential amplifier and a P.D. controller coupled to the output ($y_1$) from said second differential amplifier and combining the outputs from said P.I. and P.D. controllers for supplying said control valve means with a control output.

2. A control device for turbine generators having control valve means disposed in a fluid line including a source of elastic fluid and a turbine generator driven by fluid supplied from the source so as to control the feed rate of fluid to the turbine, a speed detecting means for measuring the rotational speed of the turbine and a control circuit for controlling the control valve means and in consequence the acceleration of the turbine as a function of a control output obtained by processing the output from said speed detecting means, said control circuit comprising:

a circuit for generating a primary differentiated control value ($C_2\dot{\omega}$) and secondary differentiated control value ($C_1\ddot{\omega}$) of the output (ω) from said speed detecting means;

a setter for setting a first reference value ($\omega_0$) relative to the output (ω) from said speed detecting means, a second reference value ($C_2\dot{\omega}_0$) relative to the primary differentiated control value ($C_2\dot{\omega}$) and a third reference value ($C_1\ddot{\omega}_0$) relative to the secondary differentiated control value ($C_1\ddot{\omega}$);

first, second and third differential amplifiers, said first differential amplifier being coupled to the output (ω) of said speed detecting means and being supplied with said first reference value ($\omega_0$), said second differential amplifier being supplied with said primary differentiated control value ($C_2\dot{\omega}$) and said second reference value ($C_2\dot{\omega}_0$), and said third differential amplifier being supplied with said secondary differentiated control value ($C_1\ddot{\omega}$) and said third reference value ($C_1\ddot{\omega}_0$); and a P.I.D. controller supplied with the outputs ($y$) from said first, second and third differential amplifiers to generate a control output which is coupled to said control valve means.

* * * * *